Figure 1:
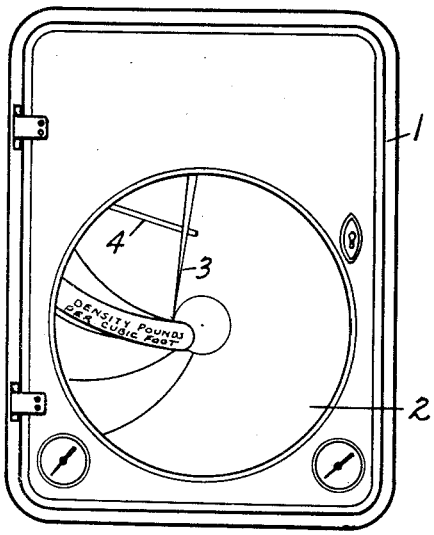

March 5, 1957     N. J. SMITH     2,783,641
GAS DENSITOMETER

Filed Sept. 30, 1953     7 Sheets-Sheet 1

Norman J Smith
INVENTOR.

BY Ralph Hammar
Attorney

March 5, 1957

N. J. SMITH 2,783,641

GAS DENSITOMETER

Filed Sept. 30, 1953

7 Sheets-Sheet 2

INVENTOR.
Norman J Smith
BY
Ralph Hammer
Attorney

March 5, 1957 N. J. SMITH 2,783,641
GAS DENSITOMETER

Filed Sept. 30, 1953 7 Sheets-Sheet 3

Norman J. Smith
INVENTOR.

BY Ralph Hammer
Attorney

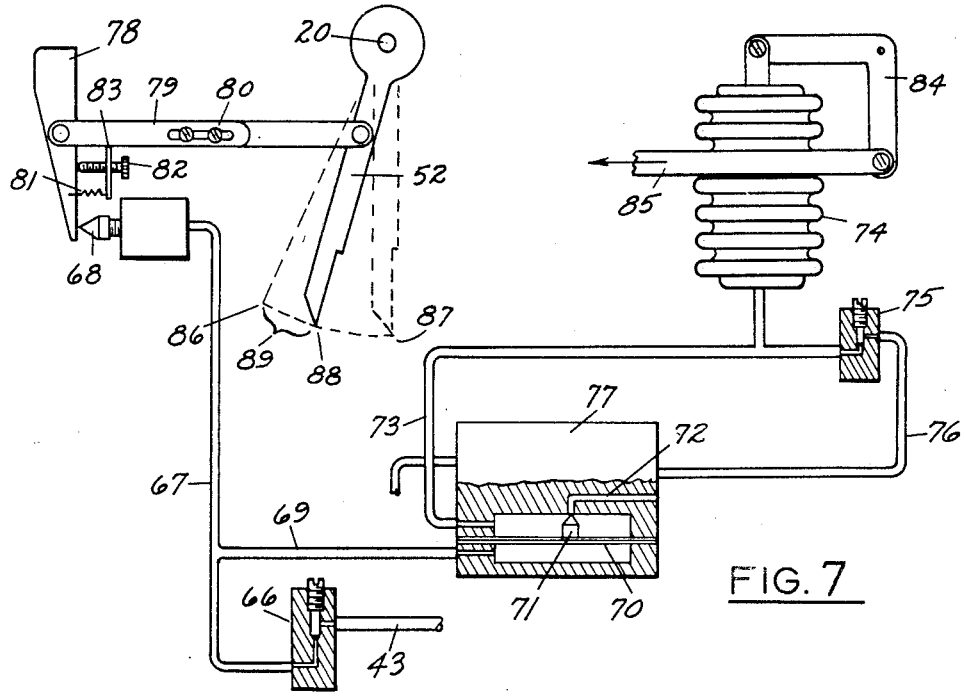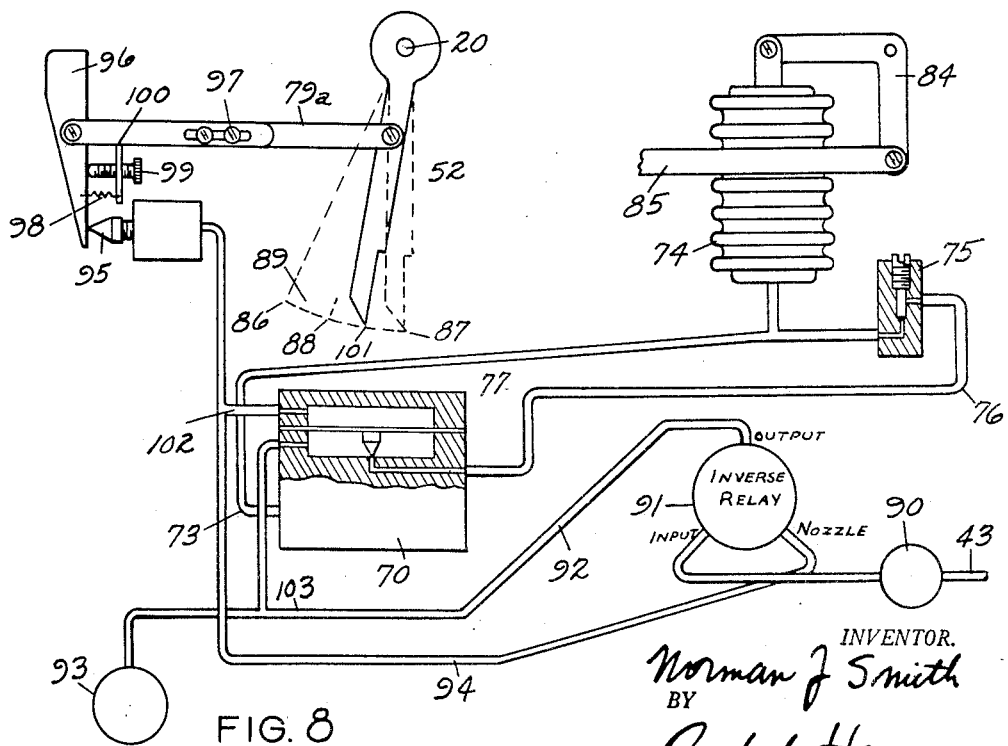

March 5, 1957   N. J. SMITH   2,783,641
GAS DENSITOMETER
Filed Sept. 30, 1953   7 Sheets-Sheet 5

INVENTOR.
Norman J Smith
BY
Ralph Hammar
Attorney

March 5, 1957  N. J. SMITH  2,783,641
GAS DENSITOMETER
Filed Sept. 30, 1953  7 Sheets-Sheet 6
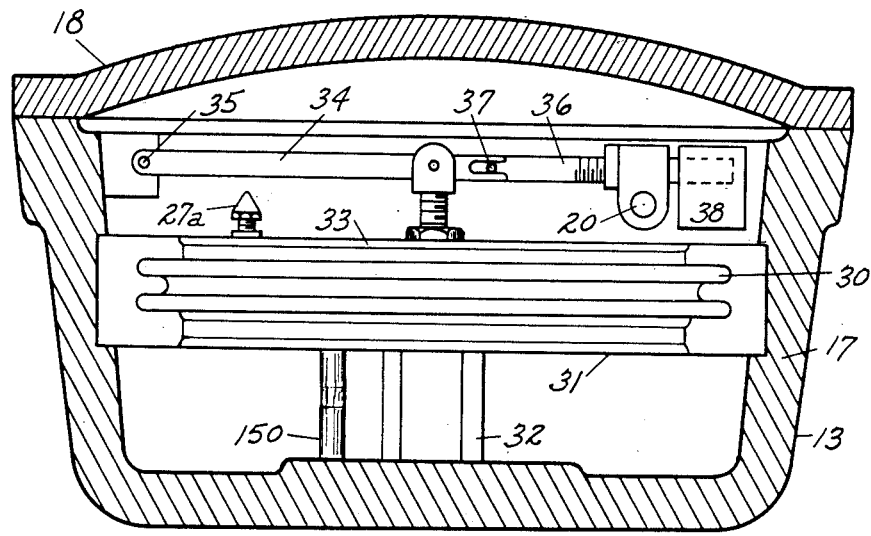
FIG. 13
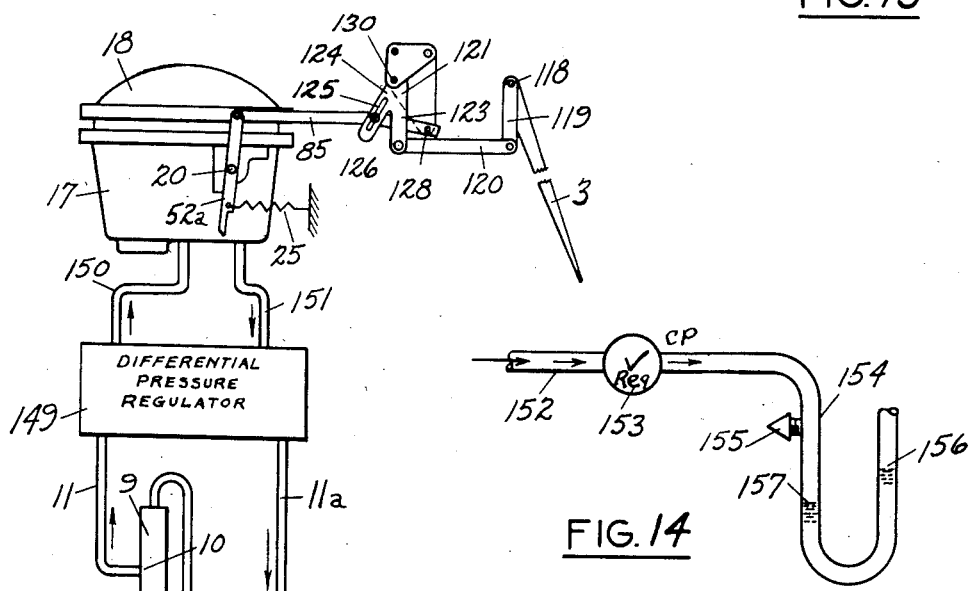
FIG. 12
FIG. 14
INVENTOR
Norman J. Smith
BY Ralph Hammar
ATTORNEY

United States Patent Office 2,783,641
Patented Mar. 5, 1957

2,783,641

GAS DENSITOMETER

Norman J. Smith, Erie, Pa., assignor to American Meter Company, Incorporated, Erie, Pa., a corporation of Delaware Application September 30, 1953, Serial No. 383,316

16 Claims. (Cl. 73—30)

This invention is intended to provide an instrument for measuring the density of gas. There are many applications in which the density of gas is important. In flue gas, the density is an indication of the carbon dioxide content. In gas pipe lines, the density of the gas is an indication of the B. t. u. content. Furthermore, measurement of the density of gas flowing in pipe lines would permit a simpler and more accurate computation of the flow. Other uses will become apparent.

The instrument is based on the scientific principle that at constant temperature and pressure the rate of diffusion of gas through a restriction is inversely proportional to the square of the density of the gas. In applying this principle to a gas density measuring instrument, an expansible chamber such as a bellows is arranged within a casing housing the sample whose density is to be measured. In the measuring operation, the top and side walls of the bellows are raised to expand the volume during which time gas is drawn into the interior of the bellows through a check inlet valve. At the limit of the expansion stroke, the bellows is released and returned or collapsed toward the normal position under such a small force that the pressure within the bellows is very close to the pressure outside the bellows. During the return stroke, the gas inside the bellows flows out through a restricted orifice or nozzle and the time taken to return the bellows from the extended to the collapsed position is a measure from which the density of the gas can be calculated. By proper calibration and by the use of a linkage, which squares the time, the density of the gas can be read directly.

In a preferred form, the timing and operating forces are obtained pneumatically. This is particularly desirable in the measurement of the density of the gas in pipe lines, because the pipe line gas pressure can supply the pneumatic operating force for the instrument.

Figure 2:
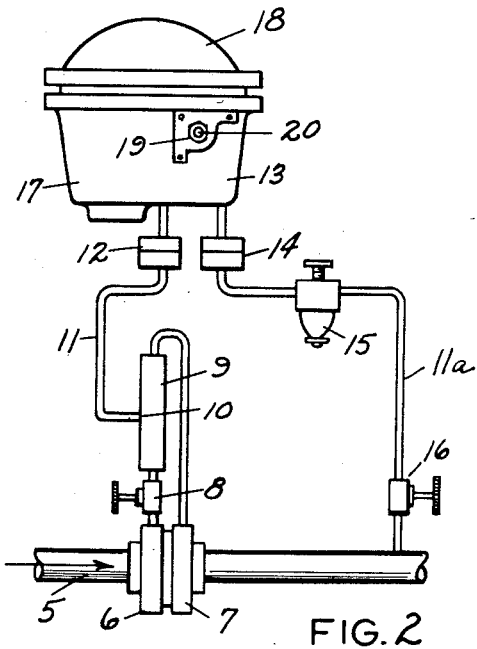
Figure 3:
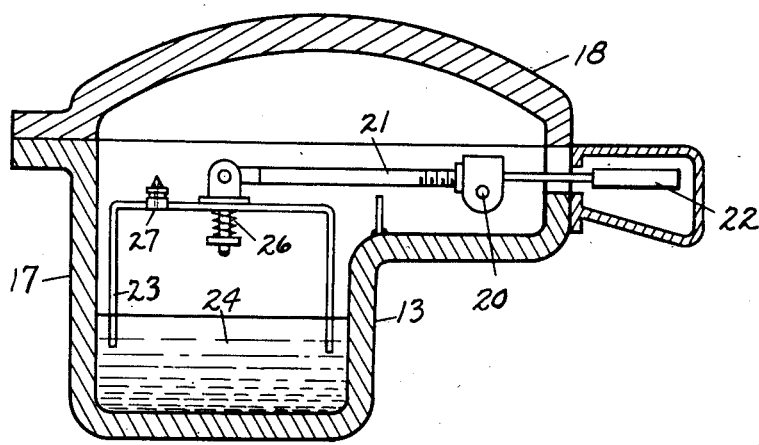
Figure 4:
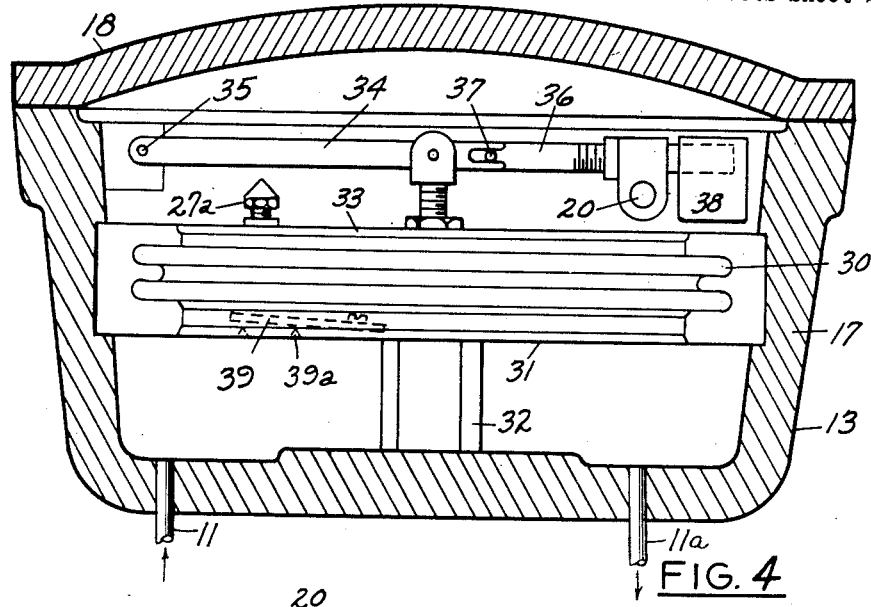
Figure 5:
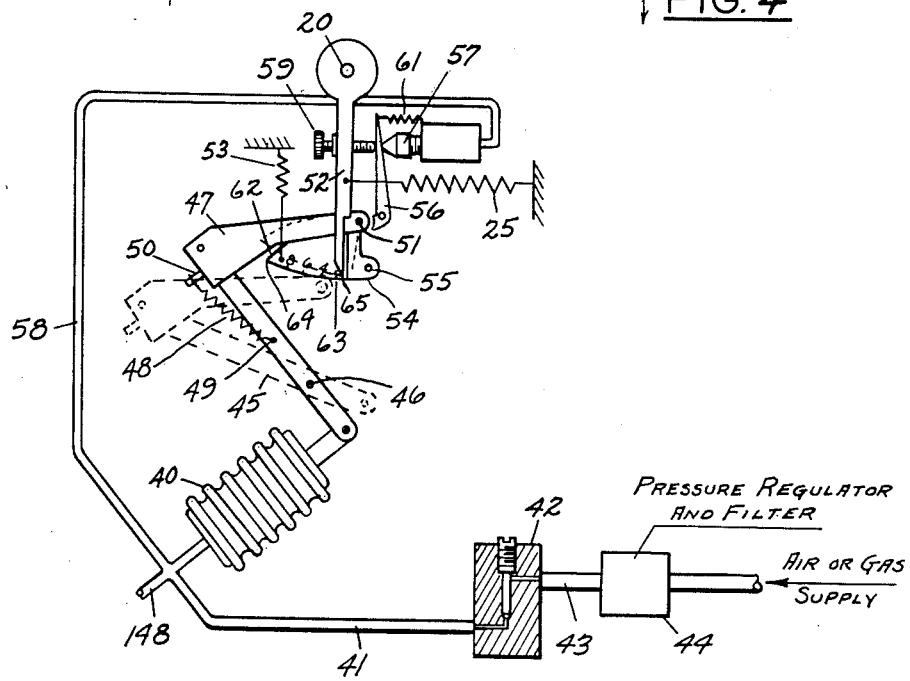
Figure 10:
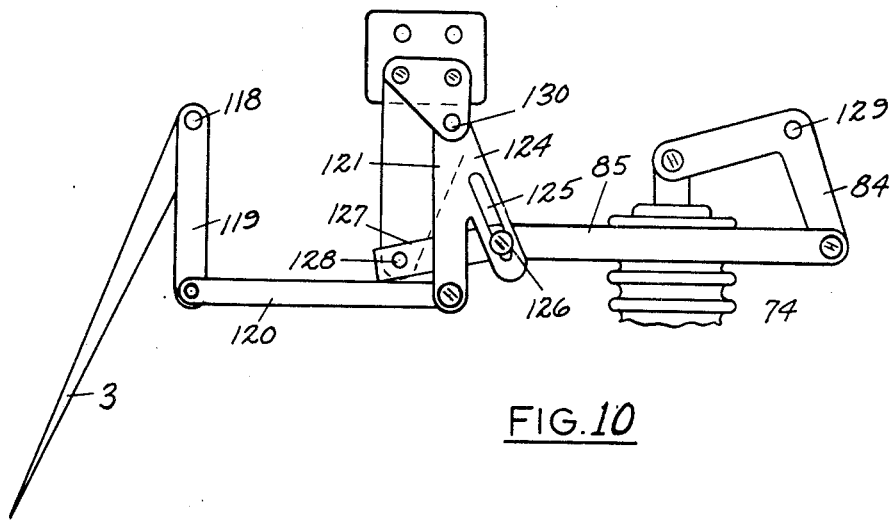
Figure 6:
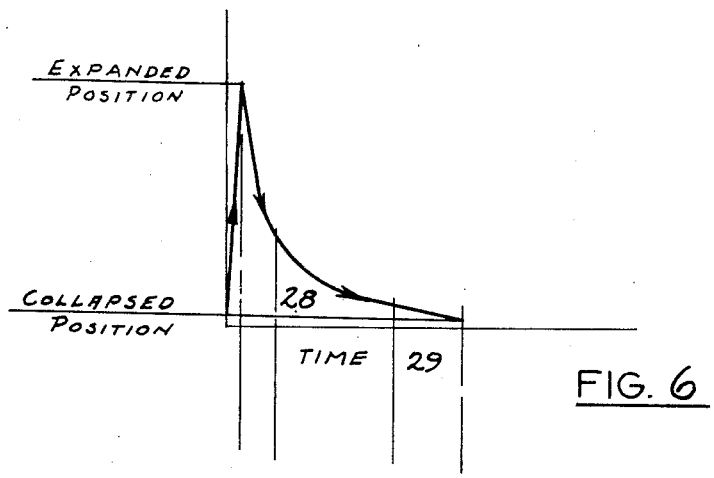
Figure 9:
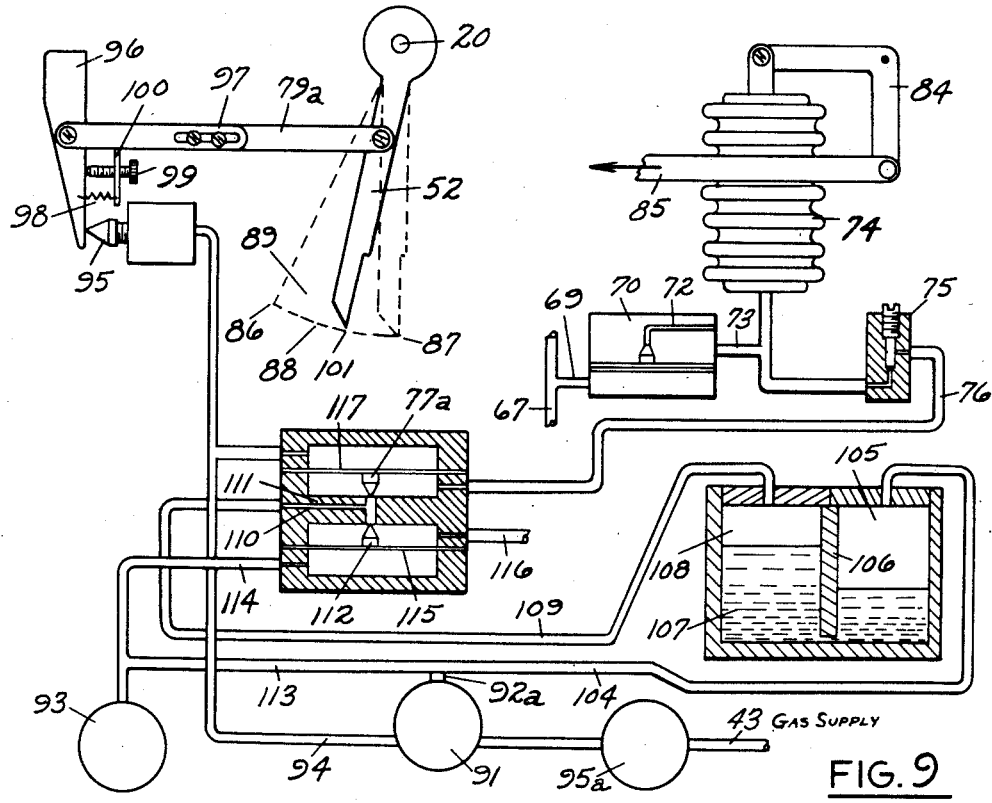
Figure 11:
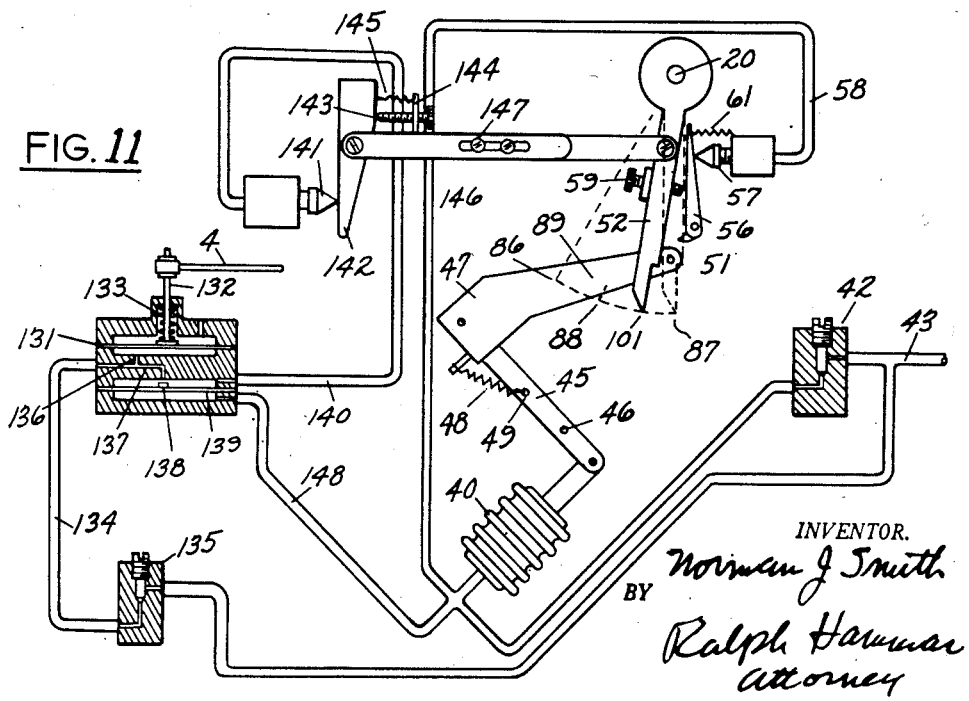
Figure 15:
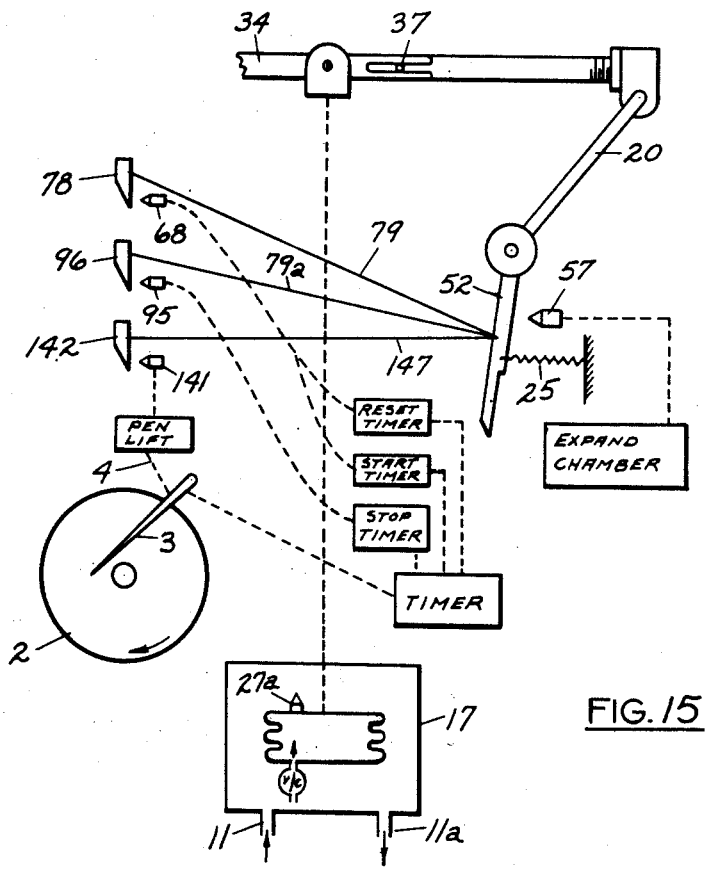

In the accompanying drawing, Fig. 1 is a front view of a gas density measuring instrument; Fig. 2 is a diagrammatic view showing the connection of the measuring instrument to a pipe line equipped with a flow measuring orifice; Fig. 3 is a sectional view of one form of gas density measuring element; Fig. 4 is a section through another form of gas density measuring element; Fig. 5 is a diagram of the arrangement for moving the expansible chamber measuring element to its expanded position and releasing the element so it can be returned to the collapsed position under a controlled force; Fig. 6 is a diagram of the time movement of the expansible chamber element during its expansion and return strokes; Fig. 7 is a diagram of the pneumatic element for starting the timing of the return stroke of the expansible chamber measuring element; Fig. 8 is a diagram of a pneumatic element for stopping the timing of the return stroke of the expansible chamber measuring element; Fig. 9 is a modification in which the gas supply is used for pneumatic operation and air is used for pneumatic timing; Fig. 10 is a view of the linkage for squaring the time of the return stroke of the expansible chamber measuring element; Fig. 11 is a diagram of the pen-lifting mechanism which lifts the pen off the chart throughout the timing stroke so that only the elapsed time squared by the squaring linkage will be recorded on the chart; Fig. 12 is a diagram of a modification giving a continuous reading of gas density; Fig. 13 is a section through the measuring element; Fig. 14 is a diagrammatic view of another modification giving a continuous reading of gas density, and Fig. 15 is a diagrammatic view of the instrument of Figs. 1–12 inclusive.

In Fig. 1 is shown an instrument having a case 1 and a twenty-four-hour chart 2 on which the density of the gas in pounds per cubic foot is marked by a pen arm 3. The clock is driven by standard clock movement and the chart is in a form similar to that heretofore used in other instruments. In Fig. 1, the pen arm is shown at its zero position and in the upper part is a lifter arm 4 which lifts the pen off the chart, until the pen reaches its maximum position corresponding to the density of the gas being measured.

In Fig. 2 is diagrammatically shown the manner in which the Fig. 1 instrument is connected to a pipe line 5 so as to measure the density of the gas flowing through the pipe line. The pipe line has standard flanges 6 and 7 for a flow measuring orifice. The flanges 6 and 7 are connected through a needle valve 8 to an intermediate pressure tap 9, which consists of equal length of capillary tubing so that at the mid or takeoff point 10 the pressure will be the mean of the up and downstream pressures on opposite sides of the flow-measuring orifice. By tubing 11 connected to the takeoff point 10 in the intermediate pressure tap 9, gas is conducted through a differential pressure check valve 12 to a measuring element chamber 13. Gas is returned from the measuring element chamber 13 by tubing 11a through a check valve 14, a sight bubbler 15, and a needle valve 16 to the downstream side of the flow-measuring orifice. The differential pressure valves 12 and 14 are safety devices which have nothing to do with the operation of the instrument but merely prevent sudden loss of pressure from the chamber 13 in case one of the lines 11 or 11a is suddenly disconnected. By this arrangement, the pressure within the measuring element chamber 13 is substantially the mean pressure of the up and downstream sides of the flow-measuring orifice and there is a slight flow of gas through the measuring chamber 13 which is sufficient to maintain the sample of gas within the measuring chamber at the mean pressure.

The measuring element chamber 13 comprises a lower body or case 17 and a cover 18. A stuffing box 19 is fastened to the lower body and a shaft 20 extends through the body into the interior of the case.

In the form of the invention shown in Fig. 3, the shaft 20 is fixed to an intermediate point on a lever 21, one end of which carries a balance weight 22 and the other end of which carries an inverted bell 23, the lower end of which is immersed in a liquid 24 such as oil. The weight 22 counterbalances the weight of the inverted bell 23 so that a spring such as illustrated at 25 in Fig. 5 can be used to bias the shaft 20 in a counter-clockwise direction as viewed in Fig. 3. The biasing force of the spring 25 is equivalent to a weight which would come within the term spring means. A spring is preferred, because it is easier to adjust than a weight and is more satisfactory under vibration conditions. The inverted bell 23 carries a spring loaded intake valve 26 and an orifice or nozzle 27. The purpose of the intake valve 26 is to permit the inflow of gas from the housing 13 into the interior of the bell as the shaft 20 is rotated in a clockwise direction, as viewed in Fig. 3. The purpose of the orifice or nozzle 27 is to restrict the flow of gas out of the interior of the bell 23 into the casing 13 as the shaft 20 is rotated in a counter-clockwise direction under the force exerted by the spring 25. With this instrument, the shaft 20 is rotated in a clockwise direction to raise the inverted bell 23 to its maximum or expanded position, and the shaft is then released and is returned to a minimum or lower position under the influence of the spring 25. The time taken to return the bell 23 from its uppermost to its lowermost position will depend upon the force exerted by the spring 25 and upon the restriction offered to the outflow of gas by the orifice 27. Fig. 6 shows a time diagram of the upward and downward movement of the bell 23. The reliable part of this time-curve useful for measuring is indicated between the lines 28 and 29, 28 being the start of the timing of the downward movement of the bell 23 and 29 being the stopping point. The time motion of the bell 23 on its downward movement is an exponential curve and the portion of the curve selected eliminates the start of the downward movement which might have objectionable transients and eliminates the extreme end of the downward movement where the force of the spring might be too small.

In the form of the instrument shown in Fig. 4, the expansible chamber measuring element consists of a flexible rubber or leather bellows 30 having its bottom wall 31 fixed to a pedestal 32 in the lower body 17 of the casing and having its top wall 33 fixed to a lever 34 pivoted at 35 to the casing part 17. The shaft 20 is fixed to an intermediate point on a lever 36 having a fork pin drive 37 to the lever 34 at one end and at the other end carrying a counterbalance weight 38 which counterbalances the dead weight of the bellows 30. Instead of the spring-loaded intake check valve 26 used in Fig. 3, a rubber flapper inlet check valve 39 is provided in the bottom wall 31 of the bellows. The rubber flapper valve provides a very positive check against a knife-edge seat 39a with a negligible pressure differential so that at the end of the up stroke of the bellows, the pressure of the gas within the interior of the bellows is very close to the pressure of the gas on the outside of the bellows. An orifice 27a of the same construction as the orifice 27 in Fig. 3 is mounted on the top wall 33 of the bellows. The operation of the measuring element in Fig. 4 is essentially the same as in Fig. 3. The shaft 20 is rotated through a predetermined angle in a clockwise direction thereby lifting the top wall 33 of the bellows to expand the interior volume of the bellows and draw gas in through the intake valve 39. The shaft 20 is then released and is returned by the spring 25, which rotates the shaft 20 in a counter-clockwise direction and collapses the bellows 33 causing gas to flow out through the orifice 27a at a rate related to its density. The time motion curve of the bellows 33 both on the up or expansion stroke and the down or collapsing stroke is shown in Fig. 6.

In both forms of expansible chamber measuring element, it is necessary that the chamber be expanded to its maximum position, then suddenly released and returned by the spring 25 or other suitable force to its minimum position. An arrangement for accomplishing this result is illustrated in Fig. 5. The power stroke for expanding the expansible chamber measuring element comes from a bellows 40 fed through a line 41 and a needle valve 42 from a pressure regulated air or gas supply 43. When the instrument is connected to the pipe line illustrated in Fig. 2, it will be convenient to supply the drive bellows from gas pressure taken directly from the line through a suitable pressure regulator and filter element illustrated at 44. The bellows is connected to a lever 45 pivoted at 46 intermediate its ends and having at the end remote from the bellows a hinge link 47 which is biased to a fixed stop position shown in full lines in Fig. 5 by a tension spring 48 arranged between a pin 49 on the lever 45 and a pin 50 on the hinge link 47. At the free end of the hinge link is a pin 51, which cooperates with a lever 52 fixed to the shaft 20 to move the lever 52 in a clockwise direction whenever the drive bellows 40 is expanded. Just prior to the return of the lever 52 to the position shown in full lines, a spring 53 cooperating with a heart-shaped cam 54 pivoted at 55 has held the heart-shaped cam in the raised or dotted line position in which it engages a flapper 56 and moves the flapper away from the nozzle 57 connected to the drive bellows through a line 58. So long as the flapper 56 is away from the nozzle 57, the pressure within the drive bellows 40 is exhausted and the drive bellows accordingly is in its normal or collapsed position. As the lever 52 continues its movement in a counter-clockwise direction to the minimum position shown in Fig. 5, a set screw 59 on the lever engages the flapper 56 and moves it against the nozzle 57 thereby closing the line 58 leading to the drive bellows and permitting a quick build-up of pressure within the drive bellows. The closing of the flapper 56 by the set screw 59 is aided by a tension spring 61, which normally tends to hold the flapper closed against the nozzle, although the force of the spring 61 is less than that exerted by the spring 53 through the heart-shaped cam 54. As the drive bellows 40 expands, the pin 51 is moved to the left thereby pivoting the lever 52 in a clockwise direction. During this movement, the pin 51 travels along the upper curved surface 62 of the heart-shaped cam 54 and the lower end of the lever 52 travels along an arc coincident with the lower surface 63 of the heart-shaped cam. When the pin 51 and the lever 52 reach the point 64 of the heart-shaped cam, the pin 51 rides off the end of the lever 52 and the spring 53 immediately lifts the heart-shaped cam to the dotted line position. This movement of the heart-shaped cam moves the flapper 56 clear of the nozzle 57 thereby venting the drive bellows 40, which returns to its collapsed position. As the drive bellows 40 returns to its collapsed position, the pin 51 rides along the lower surface 63 of the heart-shaped cam and accordingly does not interfere with the movement of the lever 52. The lower end of the lever 52 is beveled as indicated at 65 so that it serves as a pointer. The drive bellows almost immediately returns to its collapsed position while the lever 52 returns at a rate determined by the density of the gas within the expansible chamber measuring elements as indicated by the plot of the motion of the lever 52 against time in Fig. 6. As shown in Fig. 6, the entire return movement of the lever 52 is not used for the determination of the density of the gas, but only that portion between the selected points 28 and 29 which comprise only a fraction of the return movement. In Figs. 7 and 8 are shown arrangements for respectively starting and stopping the timing of the movement of the lever arm 52 at the points 28 and 29 in the Fig. 6 diagram.

In Fig. 7, the air or gas supply 43 is connected through a needle valve 66 to a line 67 leading to a nozzle 68. So long as the nozzle 68 is uncovered, the pressure in line 67 is low and this pressure is led through a line 69 to the underside of a normally open diaphragm controlled exhaust valve 70. The upper side of the diaphragm valve 70 has a valve member 71 controlling a way 72 leading to the atmosphere. So long as the valve member 71 is in its normal position, the pressure in a line 73 leading to a timing bellows 74 is exhausted to the atmosphere through the way 72. This is true even though the timing bellows is being supplied with air at constant pressure through a choke valve 75 and a line 76 connected through a shutoff valve such as shown in detail at 77 in Fig. 8 or at 77a in Fig. 9. The point at which admission of air to the timing bellows starts is controlled by an override flapper 78 connected by a link 79 to the lever 52. An adjustable connection 80 is provided in the link so that the movement of the flapper 78 can be precisely adjusted. The override flapper 78 is of well-known construction and for the purpose of this application is illustrated as being biased by a spring 81 against a stop 82 carried in a bracket 83 on the link 79. The stop 82 limits motion of the flapper in a counter-clockwise direction but freely permits movement of the flapper in a clockwise direction. When the lever 52 is at its maximum position indicated by dotted lines, the flapper 78 is clear of the nozzle 68 and the timing bellows 74 is accordingly exhausted to atmosphere through the exhaust valve 70 and is at its normal or collapsed position. As the lever 52 moves in a counter-clockwise direction from its maximum position under the biasing force of the spring 25, it comes to the position indicated at point 28 on the time motion diagram of Fig. 6 at which the timing of the further collapsing movement of the expansible chamber measuring element is to begin. At this point, the lever 52 is in the position indicated in full lines in Fig. 7 and the flapper 78 contacts the nozzle 68 thereby causing the pressure in line 67 to build up and the exhaust valve 70 to close. When this happens, air is admitted to the timing bellows through the line 76 and the choke valve 75 causing expansion of the timing bellows at a constant rate. This expansion is transmitted through a bell crank lever 84 to a link 85 connected to the squaring mechanism illustrated in Fig. 10. The override flapper 78 remains in contact with the nozzle 68 until the lever arm returns to the zero position indicated at the right in dotted lines and while the lever arm is being returned to its maximum position by the drive bellows illustrated in Fig. 5. As the lever arm passes through the position illustrated in full lines in Fig. 7 on its way to the maximum position, the flapper 78 moves away from the nozzle 68 and exhausts the timing bellows 74 through the normally open exhaust valve 70 thereby resetting the timing bellows so that it is ready to start the next timing operation.

To aid in understanding the operation of Fig. 7, the maximum position of the lever 52 is indicated by the numeral 86 and the minimum position of the lever 52 is indicated by the numeral 87. The point at which the timing starts is indicated by the numeral 88 and the region between the numerals 86 and 88 enclosed by the bracket 89 is the time during which the timing bellows 74 is reset.

While the arrangement shown in Fig. 7 determines the point at which the timing of the return movement of the expansible chamber measuring element is started, in order that the timing may be accurate, it is necessary to determine the point at which the timing stops, namely, the point indicated at 29 on the Fig. 6 time diagram. This is accomplished by the apparatus illustrated in Fig. 8. As there shown, the constant air or gas pressure supply line 43 is led through a gauge 90 to an inverse pressure amplifying relay 91 having an output line 92 leading to the normally open diaphragm shut-off valve 77. A gauge 93 connected to the line 92 indicates the output pressure supplied to the valve 77. The relay 91 has a line 94 fed directly from the air pressure supply line 43 and leading to a nozzle 95 cooperating with an override flapper 96 fastened to a link 79a through an adjustable connection 97. The override flapper is biased by a spring 98 against a stop 99 carried on a bracket 100 on the link 79a. The flapper 96 is out of contact with the nozzle 95 from the maximum position of the lever 52 indicated by the reference numeral 86 down to the position indicated by the reference numeral 101, which corresponds to the point indicated by the reference numeral 29 on the Fig. 6 diagram. When the lever 52 reaches the point indicated by the reference numeral 101, the flapper 96 closes against the nozzle 95 and the pressure in the line 94 builds up thereby causing an amplified drop in pressure in the line 92 leading from the output of the inverse pressure relay 91. The nozzle pressure appearing in line 94 is conducted through a line 102 to the upper side of the diaphragm shut-off valve 77 and the reduced pressure appearing in the output line 92 of the inverse pressure relay is conducted by a line 103 to the lower side of the diaphragm shut-off valve 77. This results in a rapid shut-off of the valve 77 when the lever 52 reaches the point 101 in its return stroke and since the exhaust valve 70 is closed whenever the lever is below point 88, the air which has been admitted to the timing bellows 74 while the lever 52 has been travelling from point 88 to point 101 is trapped within the timing bellows thereby maintaining the timing bellows in an expanded condition which is a direct measure of the time taken for the lever to move between the points 88 and 101. The expansion of the timing bellows 74 very accurately measures the time, because the flow of air through the needle valve 75 at constant pressure is at a constant rate starting with the closing of the exhaust valve 71 when the lever 52 reaches point 88 and ending with the closing of the shut-off valve 77 when the lever 52 reaches point 101. The air sealed within the timing bellows 74 by the closing of the shut-off valve 77 remains trapped within the bellows while the lever 52 moves from point 101 to the zero position indicated by the reference numeral 87 and until the lever 52 moves past point 101 on its return stroke by the mechanism illustrated in Fig. 5. The time during which the air is trapped within the timing bellows 74 is used as hereinafter described in connection with Fig. 11 to actuate the pen arm 3 to mark the chart 2.

While the rate of flow through the needle valve 25 is constant when air is used in the supply line 43, it has been found that the rate varies when gas is used in the supply line 43. The reason for this is that the needle valve 75 is a restriction and the rate of flow of any gas through a restriction varies with the density of the gas. For this reason, an arrangement is shown in Fig. 9 in which air pressure is used for the timing bellows 74 while gas is used for the other pneumatic operating parts of the system which are not dependent upon the rate of flow.

In Fig. 9, the parts which are the same as in Fig. 8 are indicated by the same reference numerals. These are the parts which are fed from the constant pressure regulated gas supply line 43. The pressure from the gas supply line 43 is fed through a gas supply gauge 95a to the inverse pressure relay 91. The nozzle 95 is fed through the nozzle supply line 94 leading from the relay. Whenever the lever 52 is within the range between the maximum point 86 and the point 101 at which the flapper 96 closes on the nozzle 95, the nozzle pressure appearing in line 94 is low and the output pressure in the output line 92a of the inverse pressure relay 91 is high. The relay output pressure appearing in line 92a is fed through a line 104 to the upper part of a gas chamber 105 on one side of a partition 106, the lower end of which has a liquid seal 107. On the other side of the partition 106 above the liquid seal is an air chamber 108 having a line 109 leading to a way 110 in the center partition 111 of a double valve, the upper side of which consists of a normally open shut-off valve 77a performing the function of the diaphragm shut-off valve 77 in Fig. 8 and the lower side of which consists of a normally open exhaust valve 112, which is for the purpose of replenishing the air supply in the air chamber 108 when the gas pressure on the other side of the partition 106 drops. Because of the liquid seal at the bottom of the partition 106, the air pressure within the chamber 108 is the same as the gas pressure on the opposite side of the partition 106. Whenever the lever 52 is to the left of point 101 and the nozzle 95 is open, the gas pressure in line 104 is high and this high gas pressure is conducted by lines 113 and 114 to the underside of the diaphragm 115 of the valve 112. Since the upper side of the diaphragm 115 is at all times connected to atmosphere through the vent 116, the higher gas pressure on the underside of the diaphragm 115 causes the valve 112 to close. When the valve 112 is closed, the air pressure in line 109, which corresponds to the output pressure appearing in line 92a of the relay 91, is fed through the normally open valve 77a to the line 76 leading through the choke valve 75 to the timing bellows 74 and accordingly supplies the timing bellows with air at the same pressure as the output pressure of the relay 91. This means that when the lever 52 reaches point 88 in its return stroke, the exhaust valve 70 closes and air is supplied to the timing bellows starting the timing of the return movement of the lever 52. The exhaust valve 70 remains closed until the lever 52 moves to the left of point 88 on its return movement by the pneumatic actuator illustrated in Fig. 5. When the lever 52 reaches point 101 on its return stroke and the timing of the return movement of the lever should be stopped, the flapper 96 closes on the nozzle 55 thereby causing a build-up in the nozzle pressure appearing in line 94 and a drop in the gas pressure appearing in the output line 92a of the inverse pressure relay 91. The build-up in nozzle pressure in line 94 acts on the upper side of the diaphragm 117 of valve 77a and forces the valve downward thereby shutting off the further flow of air to the line 76 and trapping in the timing bellows 74 the air which has been stored while the lever 52 was moving from point 88 to point 101. At the same time, the drop in pressure in the output line 92a of the inverse pressure relay 91 causes a reduction in gas pressure on the underside of the valve 112 permitting the valve 112 to open and establishing a connection to the atmosphere through vent line 116 and line 109 to the air chamber 108. This permits the flow of air through the valve 112 into the air chamber 106 until the liquid level on the air side of the partition 106 drops to a point balancing the reduced gas output pressure appearing in line 104. The valves remain in this condition while the lever 52 drops from point 101 to its minimum position indicated at 87 and is returned past point 101 by the pneumatic actuator illustrated in Fig. 5. As the arm 52 moves past point 101 on its up stroke, the nozzle 95 is uncovered and the output pressure appearing in the inverse pressure relay 91 rises thereby closing the valve 112 and opening valve 77a due to the drop in nozzle pressure fed to the upper side of the diaphragm 117. As the lever 52a moves past point 88 on its upstroke, the exhaust valve 70 is opened thereby venting the timing bellows 74 to the atmosphere and releasing the air which has been trapped in the timing bellows 74. The operation of the Fig. 9 system is the same as the Fig. 8 system insofar as the timing is concerned. The timing takes place during that part of the return movement of the arm 52 indicated between points 88 and 101. The advantage of the Fig. 9 system is that it permits the use of a pressure regulated gas supply for operating all the pneumatic elements, except the timing bellows, and the timing bellows is supplied with air so that the timing will be unaffected by the density of the gas.

While the timing bellows 74, when fed at a constant rate through the choke valve 75, has an expansion exactly proportional to the time required for the arm 52 to travel between points 88 and 101, the density of the gas sample being measured is inversely proportional to the square of the time and it is accordingly necessary here to record the expansion of the timing bellows 74 on a chart which will indicate a squared relation of the expansion of the time bellows, or the expansion of the timing bellows must be squared before the information is recorded on the chart. In Fig. 10 is shown a linkage connected to the drag link 85 attached to the timing bellows bell crank lever 84 which squares the expansion of the timing bellows so that the resultant can be recorded on a linear chart and will be a direct indication of the gas density. In this figure, the pen arm 3 is shown fixed to a pen arm shaft 118, which is moved by a crank arm 119 connected to a drag link 120. The other end of the drag link 120 is fixed to a bell crank lever 121 having an arm 122 provided with a slot 123 by means of which the point of connection to the drag link 120 can be adjusted. The bell crank lever 121 also has an arm 124 having a slot 125 in which slides the common pivot 126 of the link 85 connected to the timing bellows bell crank lever 84 and a link 127 carried on a fixed pivot 128. In this arrangement, the bell crank lever 84 actuated by the timing bellows has a fixed pivot 129 and the bell crank lever 121 has a fixed pivot 130. As the bell crank lever 84 moves in a clockwise direction corresponding to expansion of the timing bellows 74, the pivot pin 126 moves about an arc centered on the fixed pivot 128 and at the same time moves up in the slot 125 thereby shortening the distance between the pivot pin 126 and the fixed pivot 130 and producing a linear motion of the link 120, which has a squared relation to the linear motion of the link 85. This squared motion appearing at the link 120 is transferred to the crank arm 119 to the pen 3 thereby producing an indication of the pen which is proportional to the square of the expansion of the timing bellows 74. Since the denser gases require a longer time for the return stroke of the expansible chamber measuring element, the greater deflection of the timing bellows with the denser gases produces a correspondingly greater movement of the pen arm 3 when transmitted to the squaring linkage above-described. This permits a direct reading linear scale for the gas density, which is desirable in chart-recording instruments.

In Fig. 11 is shown an arrangement for lifting the pen off the chart until the pen arm has been moved to its full distance by the timing bellows 74 and then dropping the pen on the chart to make a recording and again lifting the pen before the air trapped in the timing bellows 74 is released and the pen arm is accordingly returned to its zero position. This permits the recording of a single indication for each cycle of operation and the consecutive indications of the gas density put on the chart result in a continuous line.

As described in connection with Fig. 5, when the arm 52 returns to its zero position, a stop 59 engages the flapper 56 and moves it against the nozzle 57 where it is held by the tension spring 61 as the build-up in pressure in the drive bellows 40 causes the arm 52 to be moved in a clockwise direction by the pin 51 connected to the hinged link 47 on the lever 45. Upon reaching its maximum position indicated by the reference numeral 86 corresponding to the full expansion of the expansible chamber measuring element shown in Figs. 3 or 4, the pin 51 rides off the heart-shaped cam 54 and the spring 53 moves the flapper 56 away from the nozzle 57 thereby venting the drive bellows 40 to atmosphere and permitting the return movement of the pin 51 along the lower side 63 of the heart-shaped cam. By the mechanism illustrated in Fig. 7, when the arm 52 reaches point 88 on its return stroke, exhaust valve 71 is closed thereby permitting air pressure to build up in the timing bellows 74. This build-up of air pressure within the timing bellows is continued until the arm 52 reaches point 101 on its return stroke at which time the valve 77 shuts off the air pressure supply to the timing bellows and since at this time the exhaust valve 71 is also closed, the air which has been discharged to the timing bellows at a constant rate through the choke valve 25 causes an expansion of the timing bellows 74, which is proportional to the elapsed time required for the arm 52 to travel from point 88 to point 101. While at this point, nothing further happens to the timing bellows; the arm 52 continues its counter-clockwise movement under the force of spring 25 until it reaches the minimum position indicated by the reference numeral 87 at which time the cycle of operations above-described is repeated. From this description, it is apparent that from the time the arm 52 is travelling on its up stroke from its minimum position indicated by reference numeral 87 to its maximum position indicated by reference numeral 86 and during the return stroke from reference numeral 86 to the point indicated by reference numeral 101, the pen arm 3 should be lifted off the chart. The only time when the pen arm can make a recording on the chart, which will correspond to the maximum indication of the timing bellows 74, is while the arm 52 is travelling from point 101 to its minimum position indicated by 87. In the arrangement shown in Fig. 11, this is accomplished by a diaphragm motor 131 having its upper side engaging a rod 132 fixed to the pen lifting bar 4 and biased downward by a coil spring 133. When there is no force applied to the underside of the diaphragm 131, the coil spring 133 moves the pen lifter arm 4 downward and permits the pen arm 3 to contact the chart and make a recording. The underside of the diaphragm 131 is supplied by a line 134 connected to the air or gas pressure supply 43 through a needle valve 135. The pressure on the downstream side of the needle valve 135 is led directly to the underside of the diaphragm 131 through a way 136. The pressure on the downstream side of the needle valve 135 is also led directly to a way 137 opposite a valve 138 on the upperside of a diaphragm 139. Leading from the upperside of the diaphragm 139 is a line 140 connected to a nozzle 141, which cooperates with an override flapper 142 held against a stop 143 carried by a bracket 144 by a tension spring 145. The bracket 144 is carried by a drag link 146 connecting the flapper 142 to the arm 52 there being an adjustable connection 147 which permits precise adjustment of the point at which the flapper 142 moves away from the nozzle 141 on the return stroke of the arm 52. While the arm 52 is being moved on its upstroke by the drive bellows 40, the drive bellows pressure is fed through a line 148 to the underside of the diaphragm 139 thereby moving the valve member 138 up to close the way 137. Under this condition, the pressure on the downstream side of the needle valve 135 is fed directly to the way 136 without any bleed and is sufficient to overcome the biasing force of the spring 33 and to raise the pen lifting bar 4 thereby keeping the pen arm 3 off the chart during the entire upstroke of the arm 52, namely, while the arm is moving from point 87 to point 86. As soon as the arm 52 reaches point 86, the pin 51 rides off the lower end of the arm 52 and the spring 53 lifts the heart-shaped cam 54 thereby venting the pressure within the drive bellows through the nozzle 57. Accordingly, at or shortly after the arm 52 reaches point 86, the pressure on the underside of the diaphragm 139 is vented and the valve 138 moves clear of the way 137 permitting the discharge of pressure from the downstream of the needle valve 135 to the nozzle 141. The nozzle 141 is engaged by the override flapper 142 while the arm 52 is returning from the maximum position indicated by point 86 to the full line position shown in Fig. 11, which is slightly past point 101 at which the air was trapped in the timing bellows by the closing of the shut-off valve 77. Accordingly, during all the time during which the timing bellows 74 is expanding an amount determined by the time required for the arm 52 to return from point 88 to point 101, the nozzle 41 has been closed by the flapper 142. This prevents the loss of pressure on the underside of the diaphragm 131 through the way 136, so the pressure on the underside of the diaphragm 131 still overcomes the biasing force of the spring 133 and holds the pen lifting bar 4 in its elevated position in which the pen 3 is out of contact with the chart. However, as the arm 52 moves slightly past point 101, the flapper 142 moves away from the nozzle 141 thereby venting the pressure on the underside of the diaphragm 131 and permitting the lowering of the pen lifting arm 4 under the biasing spring 133. This drops the pen arm 3 to the chart for a recording. The pen arm 3 is in contact with the chart only for a short interval, namely, the time required to move from a point slightly to the right of point 101 to the minimum position indicated by numeral 87. As soon as the arm 52 reaches the minimum position indicated by 87, pressure is again built up in the bellows 40 to return the arm 52 to the maximum position. The build-up in pressure lifts the pen lifter arm 4 so that no recording takes place during this return movement.

In the use of the instrument, samples of the gas whose density is to be measured are continuously supplied to the chamber 13 within which is mounted either the expansible chamber measuring element shown in Fig. 3, or the element shown in Fig. 4. Both of these measuring elements have movable walls spaced from the inside walls of the chamber 13, which are moved to an expanded position drawing the gas sample within the measuring element through a check valve and the movable walls are then returned to the normal or collapsed position causing the gas which has been drawn into the interior of the expansible chamber to be discharged through a restricted nozzle 27 or 27a at a rate which depends upon the density or molecular weight of the gas. In the most complete form where the density of the gas sample is continuously measured and recorded on a chart, the instantaneous position of the movable walls of the expansible chamber measuring element corresponds to the angular position of the arm 52 fixed to the shaft 20 mechanically connected to the movable walls of the measuring element. The arm 52 moves back and forth between a maximum or expanded position indicated by the reference numeral 86 in Fig. 9 to a minimum or collapsed position indicated by the reference numeral 87. When the arm 52 reaches the minimum position indicated by the numeral 87, the actuator illustrated in Fig. 5 moves the arm up to the maximum position indicated by the reference numeral 86 and accordingly produces a corresponding expansion of the expansible chamber measuring element. Upon reaching the maximum position, the lever 45 is tripped free of the arm 52 and quickly returns to the starting position. The arm 52 returns at a much slower rate determined by the tension of the spring 25 and the density of the gas within the expansible chamber measuring element. While the arm 52 is between the points indicated by the reference numerals 86 and 88, the flapper 78 is moved away from the nozzle 68 thereby opening the exhaust valve 71 and resetting the timing bellows 74 so that the bellows can return to a zero position and be ready for the next cycle of timing. While the arm 52 is between points 86 and 88, the timing mechanism for timing the collapsing movement of the expansible chamber measuring element is being reset so that it is ready to measure the time and thereby measure the density of the gas sample within the expansible chamber measuring element. When the arm 52 reaches the point 88 on its return stroke, the timing is started by the mechanism illustrated in Fig. 7. The timing continues until the arm reaches point 101 at which time the timing is stopped by the mechanism illustrated in either Fig. 8 or Fig. 9. At point 101, the air which has been discharged through the choke valve 75 into the timing bellows 74 is trapped in the timing bellows and the timing bellows remain in the expanded position until the arm 52 moves past point 88 on its up or expansion stroke. When the arm 52 moves slightly past point 101, the pen lifter arm 4 is dropped by the mechanism illustrated in Fig. 11 and remains dropped until the arm 52 reaches the minimum position indicated by reference numeral 87. During this time, the pen arm 3 makes a mark on the chart 2 which is proportional to the expansion of the timing bellows 74 built up while the arm 52 was travelling between points 88 and 101 squared by the linkage illustrated in Fig. 10. The pen lifter arm 4 is raised as soon as the arm 52 reaches the minimum position 87 and remains raised until the arm 52 again passes point 101 on the return stroke in a succeeding cycle of operations. In this instrument there accordingly is made on the chart 2 a succession of dots each of which represents the density of the gas sample within the expansible chamber measuring element during a single cycle of measuring operation. Since these cycles follow one upon the other, the chart record actually produced is a continuous line which provides continuous indication of the density of the gas.

In Figs. 12 and 13 is shown an instrument in which a pointer provides a continuous indication of gas density. Fig. 12 shows the instrument connected to the standard flanges 6 and 7 of a flow measuring orifice in the gas pipe line in the same manner shown in Fig. 2. However, instead of connecting the inlet and outlet lines 11 and 11a directly to the instrument, the lines 11 and 11a are connected to a differential pressure regulator 149 which is a well known device for maintaining a constant differential pressure. By means of the differential pressure regulator, the differential pressure between inlet line 150 and outlet line 151 is kept constant and does not vary with changes in pressure in lines 11 and 11a. From one aspect, the lines 150 and 151 are differential pressure regulated continuations of the lines 11 and 11a.

By reason of the constant differential pressure between lines 150 and 151, the intermittent expansion and contraction of the expansible chamber measuring element can be eliminated. The gas inlet line 150 is connected directly to the inside of the bellows 30 and the gas outlet line is connected directly to the measuring element chamber 13. There accordingly is a continuous flow of gas at constant rate into the bellows 30 through lines 11, 150 and out of the chamber through lines 151, 11a. The gas supplied by the line 150 tends to expand the bellows 30 at a constant rate determined by flow into the bellows. At the same time, the spring 25 acting on arm 52a fixed to the shaft 20 tends to collapse the bellows 30 at rate dependent upon the diffusion of gas from the interior of the bellows 30 through the orifice 27a. Since the rate of diffusion depends upon the gas density, the quantity of gas retained within the bellows continuously indicates gas density, or perhaps more accurately the square root of gas density. This instrument follows the same scientific principle, namely, that at constant temperature and pressure, the rate of diffusion of gas through a restriction is inversely proportional to the square of the density of the gas. The differential pressure regulator 149 maintains a constant pressure differential between the inlet and outlet to the instrument which is small enough so the flow through orifice 27a is in substance diffusion at constant pressure. The denser the gas, the smaller the diffusion and the greater the expansion of the bellows. While the bellows may appear stationary at any instant relative to the casing 17, when the motion of the bellows is related to the incoming gas in line 150, it will be apparent that the bellows is continually collapsing relative to the incoming gas and that the rate of collapse relative to the incoming gas from line 150 is of the same character shown in Fig. 6.

By connecting the arm 52a on shaft 20 to the pen arm 3 through the squaring linkage shown in Fig. 10, the position of the pen arm will correspond directly to gas density.

In Fig. 14 is shown another form of gas densitometer based upon the rate of diffusion. This form is better adapted to laboratory conditions. The gas supply from line 152 is fed through a valve 153 having a constant pressure output only slightly above atmospheric pressure to one arm of U tube 154. The gas is bled from the U tube through orifice 155 and because of the slight pressure differential, the flow through the orifice is in substance diffusion at constant pressure. Since the rate of diffusion is inversely proportional to the square of the gas density, the pressure within the U tube will build up above atmospheric for denser gases and will approach atmospheric for the lighter gases. The difference between liquid levels 156 and 157 will be proportional to the square root of the gas density.

The Fig. 14 instrument, unlike the previously described instrument, does not measure the gas density at line pressure but measures the density of the gas at atmospheric pressure.

In all of the instruments, there is such a small differential pressure across the orifice (27, 27a, 155) that the flow through orifice is diffusion. In all forms, the resistance to flow through the orifice (27, 27a, 155) is determined by the density of the gas. In Figs. 1–11, the spring 25 collapses the bellows at a time rate dependent upon the gas density, which is related to the pressure drop across the orifice. In Figs. 12, 13, the spring 25 balances differential pressure drop across the orifice 27a. In Fig. 14 the difference in liquid level 156, 157 balances the pressure drop across the orifice 155.

What is claimed as new is:

1. A gas density measuring device comprising a gas containing housing, an expansible chamber within the housing having movable top and side walls spaced out of contact with the housing, an inlet check valve from the housing to the expansible chamber, a discharge nozzle from the chamber to the housing, force transmitting means connected to the movable wall of the expansible chamber for moving it to an expanded position drawing gas in through the inlet valve, a part relatively stationary with respect to the movable wall, spring means connected between said part and movable wall exerting a force on the movable wall returning the movable wall of the expansible chamber from the expanded toward a collapsed or retracted position discharging gas through the nozzle at a rate corresponding to diffusion at substantially constant pressure, said rate being determined by its density, and means responsive to the rate of return movement of the movable wall for producing an indication of the density of the gas.

2. A gas density measuring device comprising a gas containing housing, a horizontal shaft journaled in the housing, an expansible chamber having movable top and side walls spaced out of contact with the housing, a lever on the shaft carrying at one end said movable walls of the expansible chamber and at the other end a weight counterbalancing the weight of said movable walls, an inlet check valve from the housing to the expansible chamber, a discharge nozzle from the chamber to the housing, means cooperating with the lever for moving the movable walls of the expansible chamber to an expanded position drawing gas in through the inlet valve, a part relatively stationary with respect to the movable wall, spring means connected between said part and movable wall exerting a force on the movable walls returning the movable walls of the expansible chamber from the expanded toward a collapsed or retracted position discharging gas through the nozzle at a rate corresponding to diffusion at substantially constant pressure, said rate being determined by its density, and means responsive to the rate of return movement of the movable walls producing an indication of the density of the gas.

3. A gas density measuring device comprising an expansible chamber having a movable wall, a housing for the chamber providing a gas containing envelope enclosing and spaced from the movable wall, an inlet check valve from the housing to the expansible chamber, a discharge nozzle from the chamber to the housing, force transmitting means connected to the movable wall of the expansible chamber for moving it to an expanded position drawing gas in through the inlet valve, a part relatively stationary with respect to the movable wall, spring means connected between said part and movable wall exerting a force on the movable wall returning the movable wall of the expansible chamber from the expanded toward a collapsed or retracted position discharging gas through the nozzle at a rate corresponding to diffusion at substantially constant pressure, said rate being determined by its density, a timer for the return movement of the movable wall, means responsive to movement of the movable wall to a predetermined point in its return movement for starting the timer, and means responsive to movement of the movable wall to a predetermined later point in its return movement for stopping the timer whereby the time intervening between starting and stopping the timer produces an indication of the density of the gas.

4. A gas density measuring device comprising an expansible chamber having a movable wall, a housing for the chamber providing a gas containing envelope enclosing and spaced from the movable wall, an inlet check valve from the housing to the expansible chamber, a discharge nozzle from the chamber to the housing, force transmitting means connected to the movable wall of the expansible chamber for moving it to an expanded position drawing gas in through the inlet valve, a part relatively stationary with respect to the movable wall, spring means connected between said part and movable wall exerting a force on the movable wall returning the movable wall of the expansible chamber from the expanded toward a collapsed or retracted position discharging gas through the nozzle at a rate corresponding to diffusion at substantially constant pressure, said rate being determined by its density, a control for actuating the means expanding the movable wall in successive cycles at the end of the return movement of the movable wall, a timer for the return movement of the movable wall, means responsive to movement of the movable wall to a predetermined point in its return movement in the successive cycles of the movable wall for starting the timer, means responsive to movement of the movable wall to a later point in its return movement in the successive cycles for stopping the timer, means recording the elapsed time between starting and stopping the timer producing an indication of the density of the gas and means for resetting the timer between successive cycles.

5. A gas density measuring device comprising an expansible chamber having a movable wall, a housing for the chamber providing a gas containing envelope enclosing and spaced from the movable wall, an inlet check valve from the housing to the expansible chamber, a discharge nozzle from the chamber to the housing, force transmitting means connected to the movable wall of the expansible chamber for moving it to an expanded position drawing gas in through the inlet valve, a part relatively stationary with respect to the movable wall, spring means connected between said part and movable wall exerting a force on the movable wall returning the movable wall of the expansible chamber from the expanded toward a collapsed or retracted position discharging gas through the nozzle at a rate corresponding to diffusion at substantially constant pressure, said rate being determined by its density, and means responsive to the rate of return movement of the movable wall for producing an indication of the density of the gas.

6. A gas density measuring device comprising a gas containing housing, an expansible chamber within the housing having movable walls spaced out of contact with the housing, an inlet check valve from the housing to the expansible chamber, a discharge nozzle from the chamber to the housing, force transmitting means connected to the movable wall of the expansible chamber for successively moving it to an expanded position drawing gas in through the inlet valve and then releasing the movable wall, a part relatively stationary with respect to the movable wall, spring means connected between said part and movable wall exerting a force on the movable wall returning the movable wall of the expansible chamber from the expanded toward a collapsed or retracted position discharging gas through the nozzle at a rate corresponding to diffusion at substantially constant pressure, said rate being determined by its density, and means controlled by the rate of return movement of the movable wall for producing an indication of the density of the gas.

7. A gas density measuring device comprising a gas containing housing, an expansible chamber within the housing having movable walls spaced out of contact with the housing, an inlet check valve from the housing to the expansible chamber, a discharge nozzle from the chamber to the housing, force transmitting means connected to the movable wall of the expansible chamber for successively moving it to an expanded position drawing gas in through the inlet valve and then releasing the movable wall, a part relatively stationary with respect to the movable wall, spring means connected between said part and movable wall exerting a force on the movable wall returning the movable wall of the expansible chamber from the expanded toward a collapsed or retracted position discharging gas through the nozzle at a rate corresponding to diffusion at substantially constant pressure, said rate being determined by its density, a timer for the return movement of the movable wall, a chart, means for driving the chart, a pen, means responsive to movement of the movable wall to a predetermined point in its return movement for starting the timer, means responsive to movement of the movable wall to a predetermined later point in its return movement for stopping the timer, a lifter mechanism for the pen, control means responsive to the running of the timer for actuating the lifter mechanism to lift the pen off the chart and for releasing the lifter mechanism at the stopping of the timer to mark the chart, control means responsive to the expanding movement of the movable wall for actuating the lifter mechanism to lift the pen off the chart, and means for resetting the timer between successive operating cycles.

8. A gas density measuring device comprising a gas containing housing, a shaft journaled in the housing, an expansible chamber within the housing having movable walls spaced out of contact with the housing, a connection between the shaft and the movable walls moving the same to expand the expansible chamber in one direction of rotation of the shaft and to contact the expansible chamber in the opposite direction of rotation of the shaft, an inlet valve from the housing to the chamber through which gas flows in upon expansion of the chamber, a discharge nozzle from the chamber to the housing through which gas flows out upon contraction of the chamber, means for driving the shaft in the direction to expand the chamber, means releasing the drive to the shaft at a predetermined expansion, spring means acting on the shaft in the direction to return the shaft from the expanded position and force gas out through the nozzle at a rate corresponding to diffusion at substanially constant pressure, and means responsive to the rate of the return movement of the shaft producing an indication of the gas density.

9. A gas density measuring device comprising a gas containing housing, a shaft journaled in the housing, an expansible chamber within the housing having movable walls spaced out of contact with the housing, a connection between the shaft and the movable walls moving the same to expand the expansible chamber in one direction of rotation of the shaft and to contact the expansible chamber in the opposite direction of rotation of the shaft, an inlet valve from the housing to the chamber through which gas flows in upon expansion of the chamber, a discharge nozzle from the chamber to the housing through which gas flows out upon contraction of the chamber, means for driving the shaft in the direction to expand the chamber, means releasing the drive to the shaft at a predetermined expansion, spring means acting on the shaft in the direction to return the shaft from the expanded position and force gas out through the nozzle at a rate corresponding to diffusion at substantially constant pressure, a timer for the return movement of the shaft having a bellows fed from a pressure regulated supply, a normally open exhaust valve venting the timing bellows, a normally open shut-off valve in the supply to the bellows, a control means responsive to movement of the shaft to a predetermined point in its return movement of the shaft for shutting the exhaust valve, a control means responsive to movement of the shaft to a predetermined later point in its return movement for shutting the shut-off valve whereby the expansion of the bellows is a measure of time related to the gas density.

10. The construction of claim 8 having in addition a squaring device actuated by the timer for squaring the time measured by the timer to produce a linear indication of gas density.

11. The construction of claim 8 having a crank arm rotated by the timing bellows, a drag link pivoted to the crank arm, another link mounted on a fixed pivot and pivoted to the drag link, an output crank arm mounted on another fixed pivot, and a slidable connection between the common pivot of said links and said output crank arm movable toward said other fixed pivot as the drag link is moved by the timing bellows whereby the movement of the output crank has a squared relation to the movement of the timing bellows.

12. A gas density measuring device comprising a gas containing housing, means causing a flow of gas through the housing to maintain a representative gas sample within the housing, an expansible chamber within the housing having movable walls spaced out of contact with the housing, an inlet check valve from the housing to the expansible chamber, a discharge nozzle from the chamber to the housing, a pneumatic actuator connected to the movable wall of the expansible chamber for successively moving it to an expanded position drawing gas in through the inlet valve and then releasing the movable wall, a part relatively stationary with respect to the movable wall, spring means connected between said part and movable wall exerting a force on the movable wall returning the movable wall from the expanded toward a contracted position at a rate determined by the flow of gas through the nozzle corresponding to diffusion at substantially constant pressure, a timer comprising a bellows, a normally open exhaust valve, a shut-off valve in the supply to the bellows, a pneumatic actuator responsive to movement of the movable wall to a predetermined point in its return movement for closing the exhaust valve, a pneumatic actuator responsive to movement of the movable wall to a predetermined later point in its return movement for closing the shut-off valve, a pressure regulated gas supply for the pneumatic actuators, and an air supply for the timing bellows including an air chamber separated from the gas supply by a movable wall subject to gas pressure on one side and to air pressure on the other side.

13. A gas density measuring device comprising a gastight housing, an expansible chamber within the housing, said chamber having a movable wall, means for supplying gas to the chamber at the temperature and pressure at which the gas density is to be measured and for expanding the chamber to receive the gas, a discharge nozzle from the chamber to the housing, means exerting a force on said movable wall having a predetermined value at each position of the movable wall and in the direction to collapse said chamber and force gas out through the nozzle to the housing at a rate corresponding to diffusion at substantially constant pressure, and means responsive to the rate of diffusion of gas through the nozzle for producing an indication of the gas density.

14. A continuous gas density measuring device comprising an expansible chamber having a movable wall, a housing enclosing said expansible chamber, means for continually supplying gas to the chamber, a discharge nozzle from the chamber to the housing, means connected to said housing exerting a force on said movable wall and having a predetermined value at each position of the movable wall and in the direction to collapse said chamber and force gas out through the nozzle at a rate corresponding to diffusion at substantially constant pressure, and means responsive to the rate of diffusion of gas through the nozzle for indicating the gas density.

15. A gas density measuring device comprising an expansible chamber having a movable wall, a housing enclosing said expansible chamber, means supplying gas to the chamber and for exerting a force expanding the chamber to receive the gas, a discharge nozzle from the chamber to the housing, biasing means connected to said housing exerting a force on said movable wall in the direction to collapse said chamber and to force gas out at a rate corresponding to diffusion at substantially constant pressure, and means responsive to the rate of diffusion of gas through the nozzle for indicating gas density.

16. A gas density measuring device comprising an expansible chamber having a movable wall, means for expanding the chamber and filling it with gas, a housing enclosing said chamber, a discharge nozzle from the chamber to the housing, a part relatively stationary with respect to the movable wall, spring means connected between said part and movable wall exerting a force on the movable wall in the direction to collapse said chamber and force gas out through the nozzle to the housing at a rate corresponding to diffusion at substantially constant pressure, and means responsive to the rate of diffusion of gas through the nozzle for indicating the gas density.

References Cited in the file of this patent

UNITED STATES PATENTS

| 676,858 | Arndt | June 18, 1901 |
| 1,264,985 | Simmance et al. | May 7, 1918 |
| 1,354,681 | Okey | Oct. 5, 1920 |
| 2,042,374 | Wunsch et al. | May 26, 1936 |
| 2,324,391 | Hersey | July 13, 1943 |
| 2,329,142 | Shank | Sept. 7, 1943 |
| 2,484,207 | Criner et al. | Oct. 11, 1949 |
| 2,642,738 | Powell | June 23, 1953 |

FOREIGN PATENTS

| 17,525 | Great Britain | June 24, 1899 |